(12) United States Patent
Torgersrud et al.

(10) Patent No.: US 10,498,840 B2
(45) Date of Patent: Dec. 3, 2019

(54) METHOD AND SYSTEM FOR EFFICIENT REVIEW OF EXCHANGED CONTENT

(71) Applicant: Telmate LLC, San Francisco, CA (US)

(72) Inventors: Richard Torgersrud, San Francisco, CA (US); John Satori Yamasaki, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 686 days.

(21) Appl. No.: 13/843,623

(22) Filed: Mar. 15, 2013

(65) Prior Publication Data
US 2014/0280630 A1    Sep. 18, 2014

(51) Int. Cl.
*G06F 15/16* (2006.01)
*H04L 29/08* (2006.01)
*H04L 12/58* (2006.01)
*H04L 29/06* (2006.01)

(52) U.S. Cl.
CPC ............. *H04L 67/22* (2013.01); *H04L 51/18* (2013.01); *H04L 63/308* (2013.01); *H04L 67/12* (2013.01)

(58) Field of Classification Search
CPC ......... H04L 65/00; H04L 51/10; H04L 51/12; H04L 51/14; H04L 51/16; H04L 51/20; H04L 51/32; H04L 51/36; H04L 65/10; H04L 65/12; H04L 65/14; H04L 65/16; H04L 65/20; H04L 65/32; H04L 10/12; H04L 10/14; H04L 10/16; H04L 10/20; H04L 10/32

USPC .................................................. 709/204, 206
See application file for complete search history.

(56) References Cited

U.S. PATENT DOCUMENTS

| | | | | |
|---|---|---|---|---|
| 6,668,045 B1* | 12/2003 | Mow | ................... | H04M 3/2281 379/67.1 |
| 7,660,413 B2* | 2/2010 | Partovi et al. | ................... | 380/33 |
| 7,742,582 B2* | 6/2010 | Harper | ................ | G06Q 20/382 379/100.08 |
| 7,979,387 B2* | 7/2011 | Wright et al. | ................ | 707/609 |
| 8,065,166 B2* | 11/2011 | Maresh et al. | ................. | 705/3 |
| 8,086,952 B2* | 12/2011 | Edd | ........................ | G06F 16/958 715/229 |
| 8,150,807 B2* | 4/2012 | Fredlund | ............ | H04N 1/00153 707/634 |

(Continued)

*Primary Examiner* — Dhairya A Patel
(74) *Attorney, Agent, or Firm* — Ferguson Braswell Fraser Kubasta PC

(57) ABSTRACT

A method for reviewing an inmate's communications that includes receiving a two-party message including a media item, and determining whether the media item is viewable pending review. When the media item is viewable pending review, placing the media item in a conditionally viewable repository for the inmate, and making the two-party message accessible to the recipient based on the media item being placed in the conditionally viewable repository for the inmate. When the media item is not viewable pending review, placing the media item in a conditionally held repository for the inmate, and making the two-party message inaccessible to the recipient based on the media item being placed in the conditionally held repository for the inmate. The method further includes receiving review results of a review process performed on the media item, and moving the media item to a reviewed media items repository based on the review results.

17 Claims, 12 Drawing Sheets

(56) References Cited

U.S. PATENT DOCUMENTS

| | | | | |
|---|---|---|---|---|
| 8,359,642 | B1* | 1/2013 | Wurtenberger | H04L 63/0227 |
| | | | | 726/7 |
| 8,731,934 | B2* | 5/2014 | Olligschlaeger et al. | 704/270 |
| 8,832,374 | B1* | 9/2014 | Schaefers | 711/115 |
| 9,113,131 | B1* | 8/2015 | Passe | H04M 3/38 |
| 2003/0174826 | A1* | 9/2003 | Hesse | H04L 12/1818 |
| | | | | 379/210.01 |
| 2004/0122790 | A1* | 6/2004 | Walker et al. | 707/1 |
| 2006/0122865 | A1* | 6/2006 | Preiss et al. | 705/2 |
| 2007/0005713 | A1* | 1/2007 | LeVasseur et al. | 709/206 |
| 2009/0228383 | A1* | 9/2009 | Martinez et al. | 705/35 |
| 2010/0299761 | A1* | 11/2010 | Shapiro | 726/28 |
| 2012/0203785 | A1* | 8/2012 | Awada | 707/740 |
| 2012/0276513 | A1* | 11/2012 | Ayers | G09B 5/067 |
| | | | | 434/310 |
| 2013/0179949 | A1* | 7/2013 | Shapiro | H04L 51/12 |
| | | | | 726/4 |
| 2014/0247926 | A1* | 9/2014 | Gainsboro | H04M 3/2281 |
| | | | | 379/88.01 |

* cited by examiner

METHOD AND SYSTEM FOR EFFICIENT REVIEW OF EXCHANGED CONTENT

CROSS-REFERENCE TO RELATED APPLICATIONS

This application is related to U.S. patent application Ser. No. 13/438,940 filed on Apr. 4, 2012, entitled "Secure Social Network." U.S. patent application Ser. No. 13/438,940 is incorporated by reference in its entirety.

BACKGROUND

Controlled facilities, such as jails, prisons, secure detention environments, detention facilities, secured hospitals, or addiction treatment facilities, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, the invention relates to a method for reviewing an inmate's communications. The method includes receiving a two-party message including a media item, where a first party of the two-party message is the inmate, and where the two-party message targets a recipient, and determining whether the media item is viewable pending review. When the media item is viewable pending review, placing the media item in a conditionally viewable repository for the inmate, and making the two-party message accessible to the recipient based on the media item being placed in the conditionally viewable repository for the inmate. When the media item is not viewable pending review, placing the media item in a conditionally held repository for the inmate, and making the two-party message inaccessible to the recipient based on the media item being placed in the conditionally held repository for the inmate. The method further includes receiving review results of a review process performed on the media item, and moving the media item to a reviewed media items repository based on the review results.

In general, in one aspect, the invention relates to a non-transitory computer readable medium comprising instructions that, when executed by a processor, perform a method for reviewing an inmate's communications. The method includes receiving a two-party message including a media item, where a first party of the two-party message is the inmate, and where the two-party message targets a recipient, and determining whether the media item is viewable pending review. When the media item is viewable pending review, placing the media item in a conditionally viewable repository for the inmate, and making the two-party message accessible to the recipient based on the media item being placed in the conditionally viewable repository for the inmate. When the media item is not viewable pending review, placing the media item in a conditionally held repository for the inmate, and making the two-party message inaccessible to the recipient based on the media item being placed in the conditionally held repository for the inmate. The method further includes receiving review results of a review process performed on the media item, and moving the media item to a reviewed media items repository based on the review results.

In general, in one aspect, the invention relates to a system for reviewing an inmate's communications that includes a message server and a database server. The message server is configured to receive a two-party message comprising a media item, where a first party of the two-party message is the inmate, and where the two-party message targets a recipient, and determine whether the media item is viewable pending review. When the media item is viewable pending review, place the media item in a conditionally viewable repository for the inmate, and make the two-party message accessible to the recipient based on the media item being placed in the conditionally viewable repository for the inmate. When the media item is not viewable pending review, place the media item in a conditionally held repository for the inmate, and make the two-party message inaccessible to the recipient based on the media item being placed in the conditionally held repository for the inmate. The message server is further configured to receive review results of a review process performed on the media item, and move the media item to a reviewed media items repository based on the review results. The database server includes the conditionally viewable repository and a rejected repository.

Other aspects of the invention will be apparent from the following description and the appended claims.

DETAILED DESCRIPTION

Figure 1:
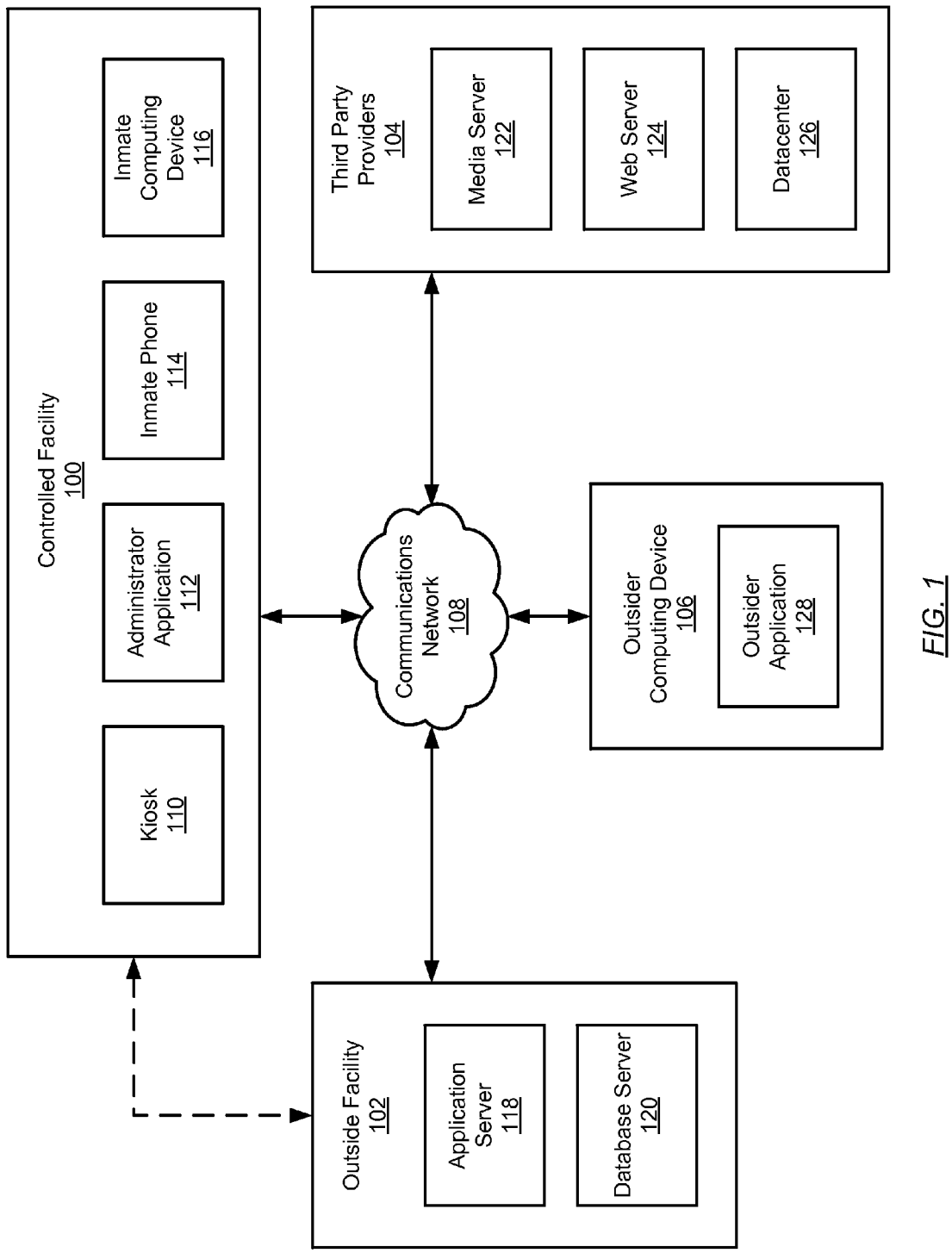
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for facilitating communication between inmates in a controlled facility and outsiders. Embodiments of the invention may include interactions with a secure social network. In one or more embodiments of the invention, a secure social network is a network application that facilitates and secures the exchange or transmission of information between two or more parties in which at least one of those parties is subject to special security or law enforcement restrictions or otherwise resides in, or is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communication account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Plain Old Telephone System (POTS)), and/or networks used for a wide array of communication types, such as the Internet through Voice over IP (VoIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
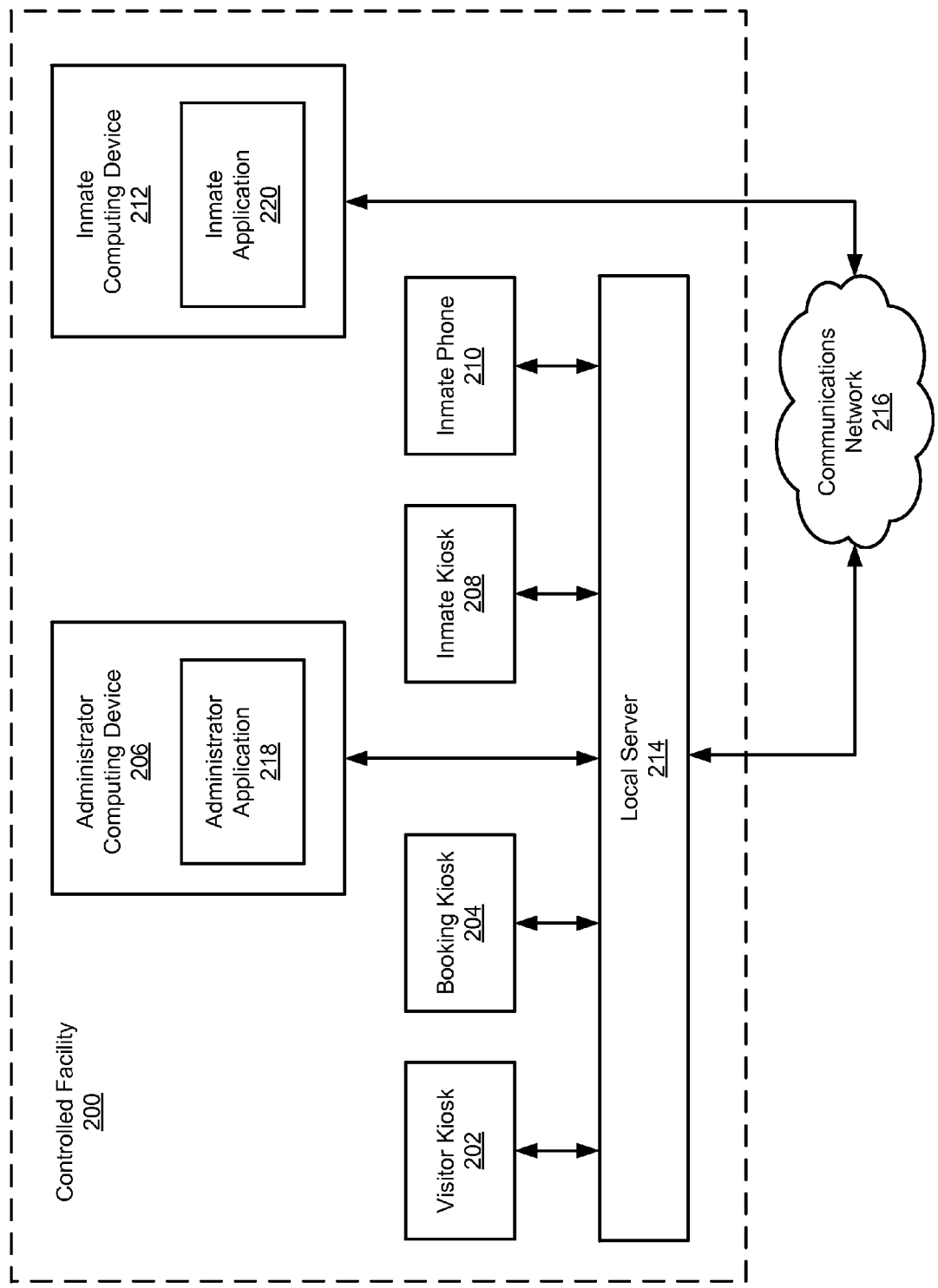
FIG. 2 shows a diagram of a controlled facility in accordance with one or more embodiments of the invention.

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, in one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in one or more embodiments of the invention, the local server (214) includes functionality to regulate inmate access to a secure social network.

Figure 3:
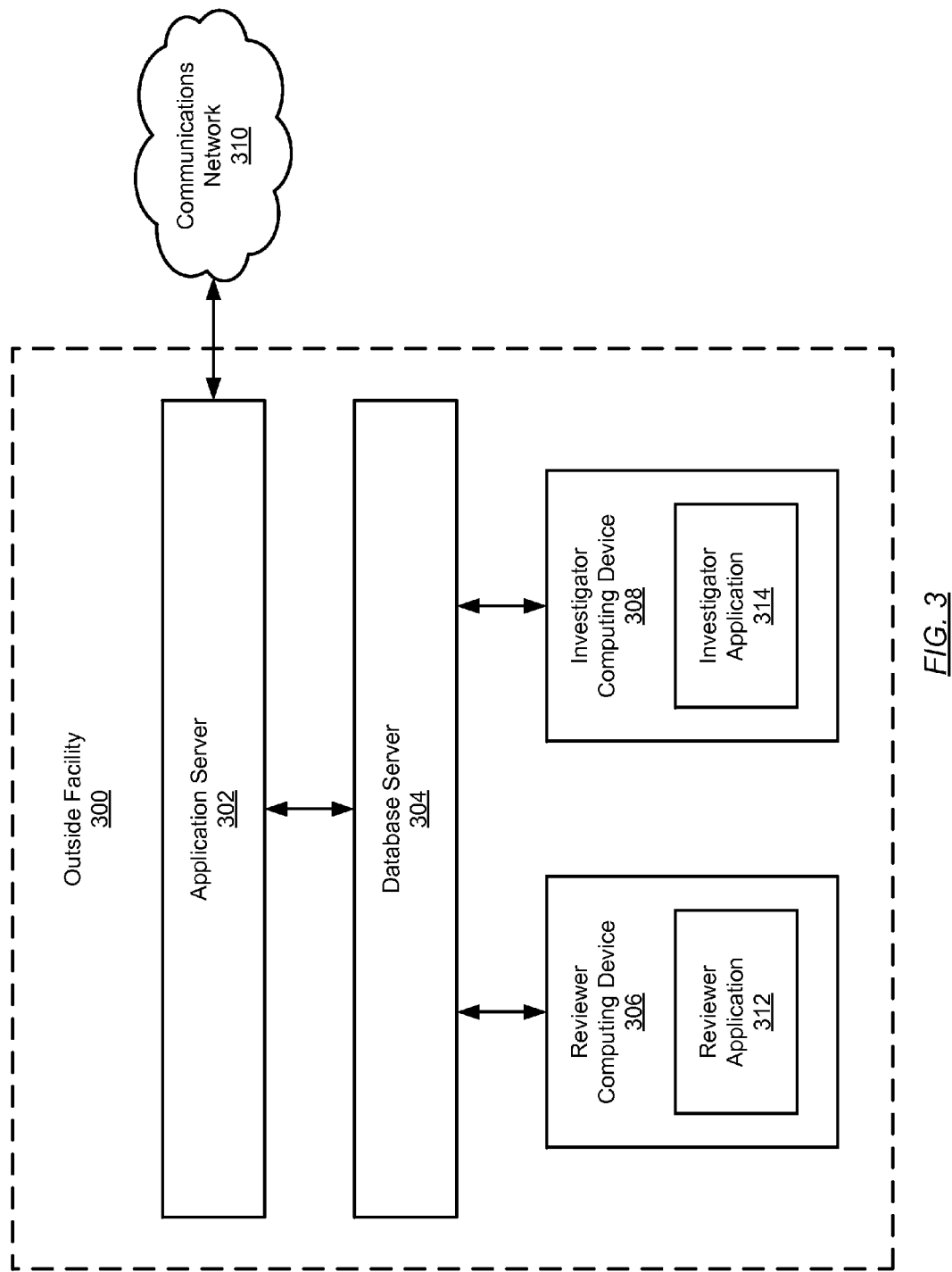
FIG. 3 shows a diagram of an outside facility in accordance with one or more embodiments of the invention.

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
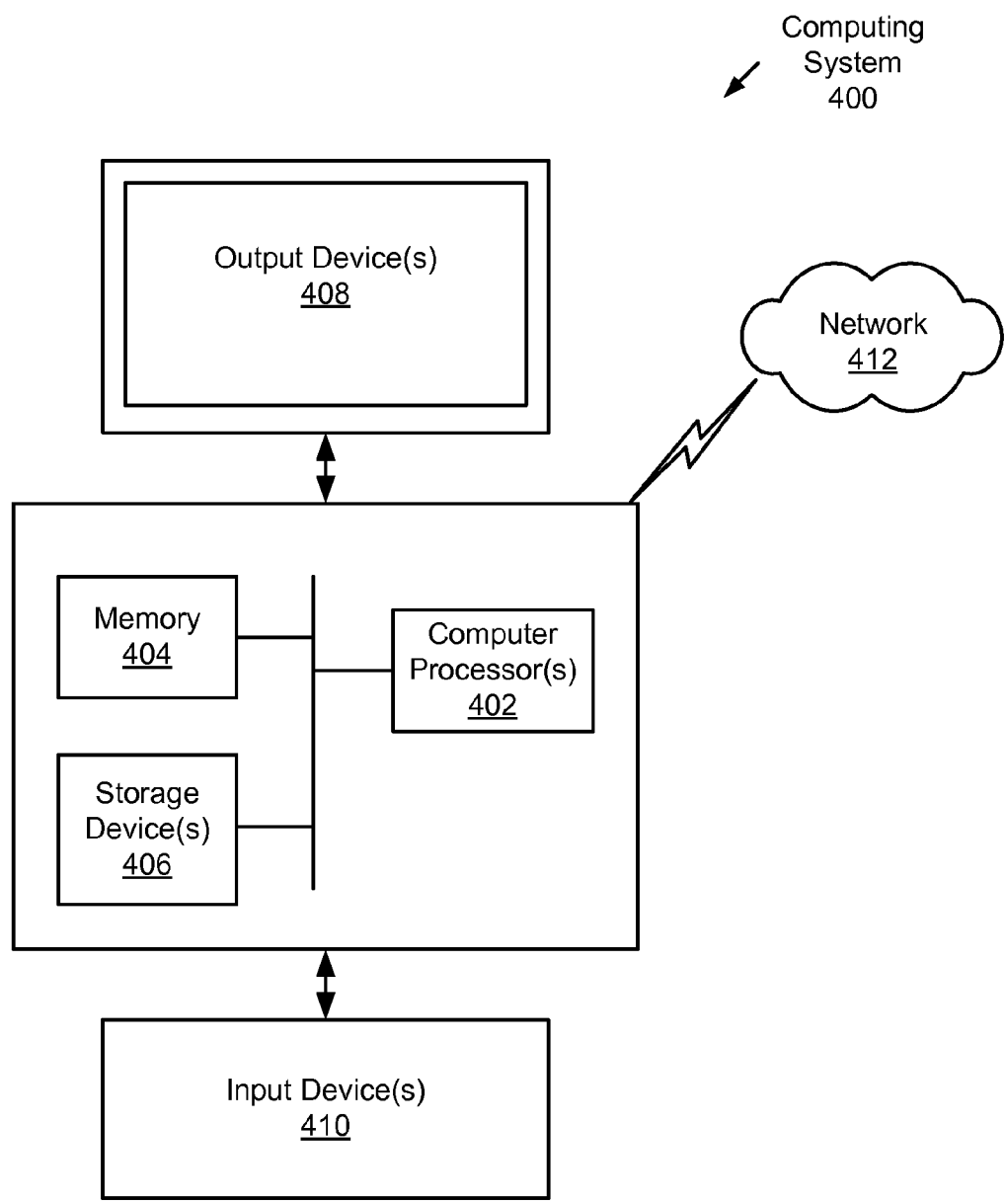
FIG. 4 shows a diagram of a computing system in accordance with one or more embodiments of the invention.

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
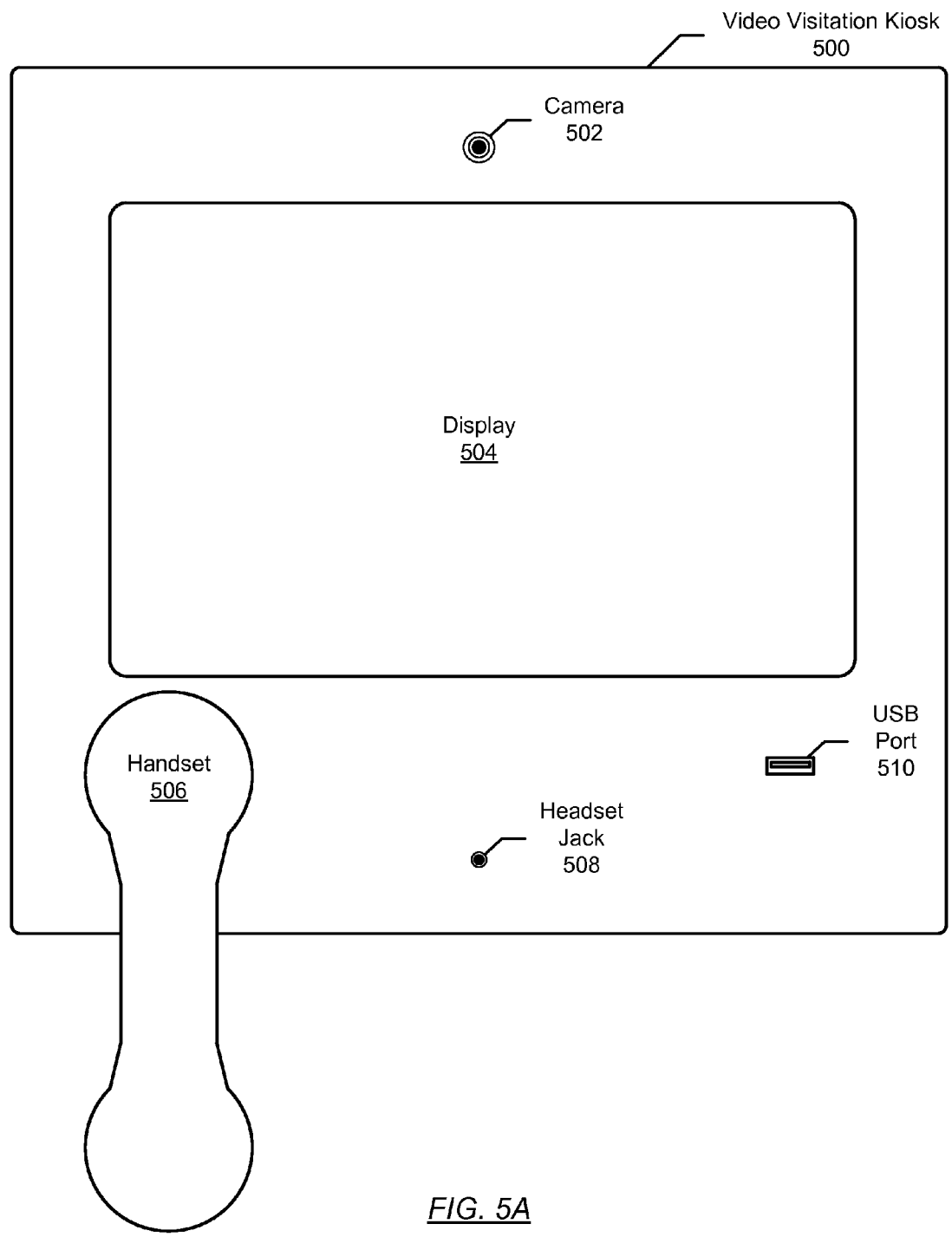
FIGS. 5A-5B show diagrams of a video visitation terminal in accordance with one or more embodiments of the invention.

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
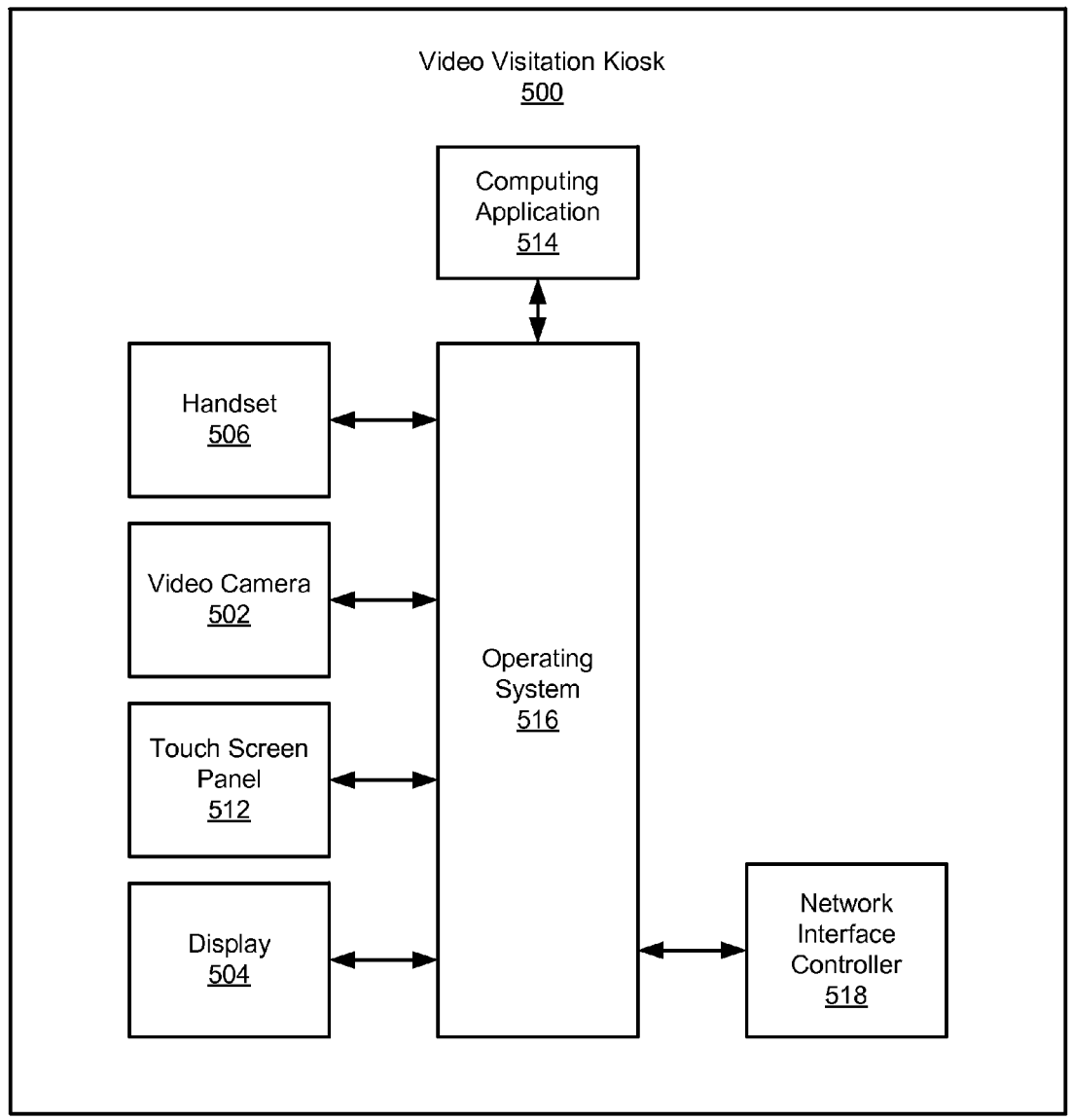

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
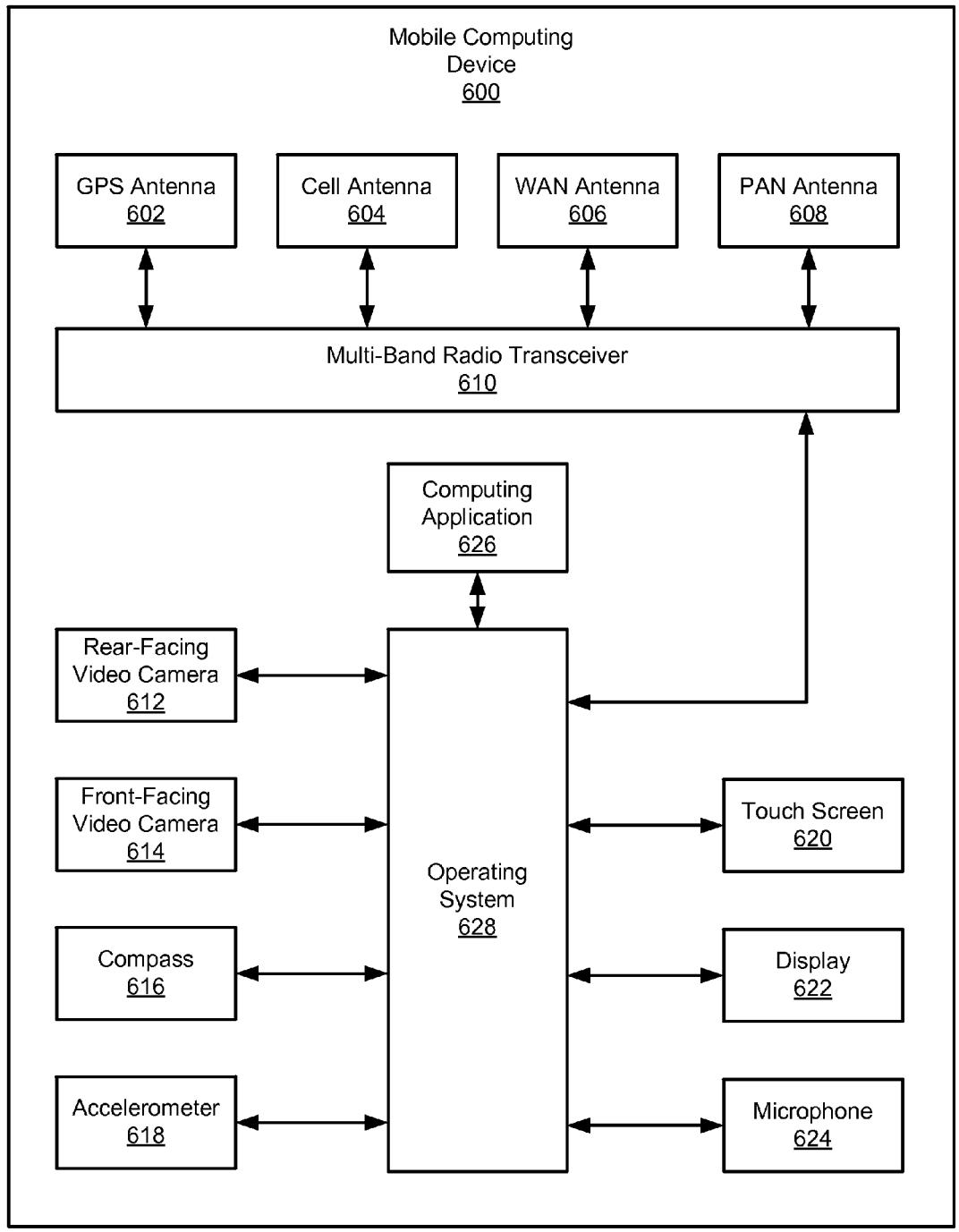
FIG. 6 shows a diagram of a mobile computing device in accordance with one or more embodiments of the invention.

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
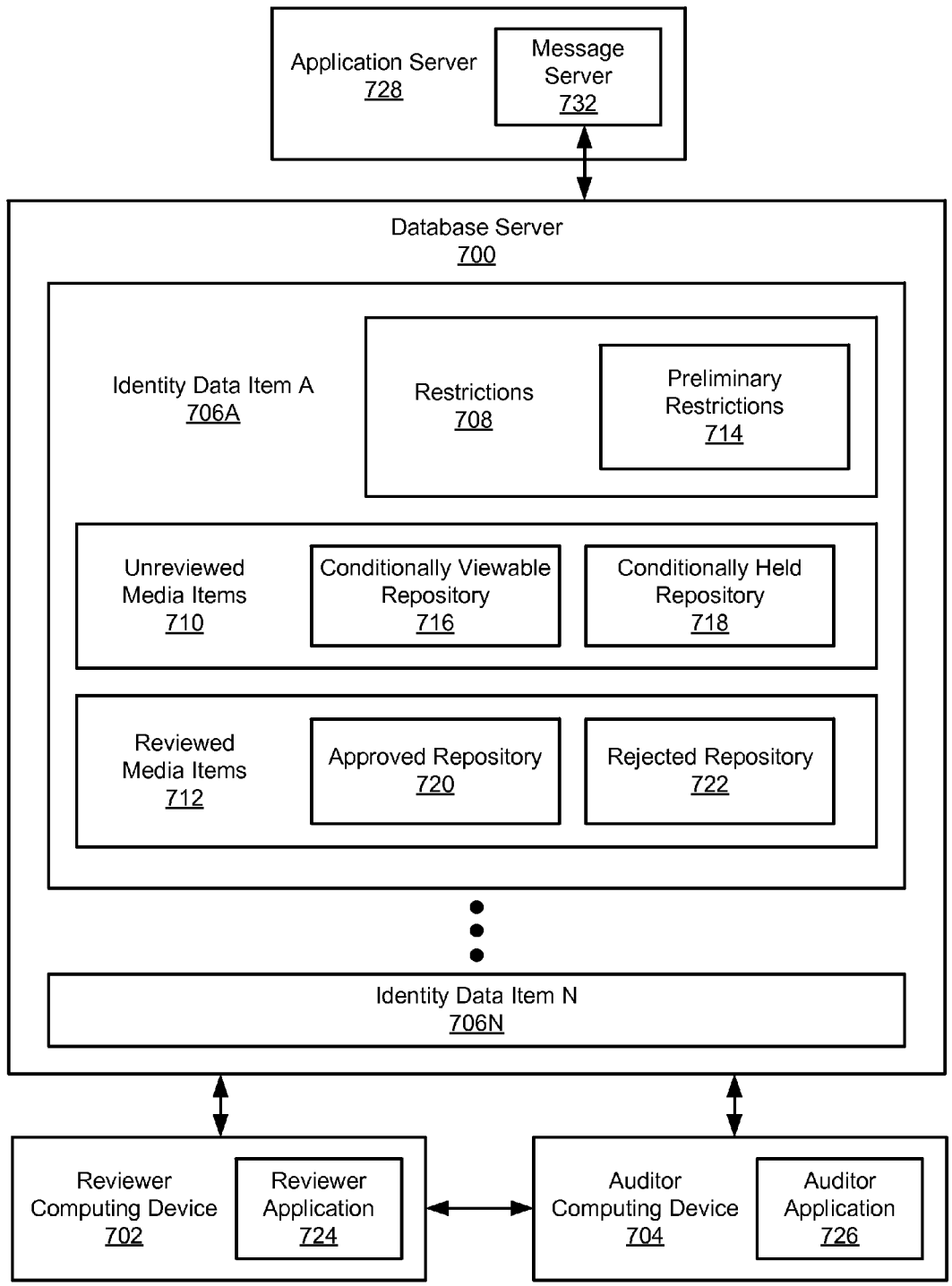
FIG. 7 shows a diagram of a database server in accordance with one or more embodiments of the invention.

FIG. 7 shows a database server in accordance with one or more embodiments of the invention. The database server shown in FIG. 7 shows addition elements to those shown in FIG. 3. As shown in FIG. 7, the database server (700) is communicatively coupled to an application server (728), a reviewer computing device (702), and an auditor computing device (704). The database server (700) may include multiple identity data items (e.g., identity data item A (706A), identity data item N (706N)). Each identity data item (e.g., identity data item A (706A), identity data item N (706N)) may include restrictions (708), unreviewed media items (710), and reviewed media items (712). The restrictions (708) may include preliminary restrictions (714). The unreviewed media items (710) may include a conditionally viewable repository (716) and a conditionally held repository (718). The reviewed media items (712) may include an approved repository (720) and a rejected repository (722). The reviewer computing device (702) may include a reviewer application (724). The auditor computing device (704) may include an auditor application (726). The application server (728) may include a message server (732).

In one or more embodiments of the invention, the message server (732) is a process or group of processes with functionality to receive messages that include media items (e.g., digital text, digital photos, digital videos, digital audio, etc.) and deliver those messages to a recipient based on a target address. Specifically, the message server (732) may receive messages addressed to, or sent from, an inmate residing within a controlled facility. The message server (732) may send and receive messages to and from an inmate application (not shown), an inmate kiosk (not shown), a visitor kiosk (not shown), and/or an outsider application (not shown). Access to the message server may require authentication of the user (e.g., inmate, visitor, or outsider) in a manner described above.

In one or more embodiments of the invention, the message server (732) may handle messages with more than one recipient. In one embodiment of the invention, a message with a single recipient is referred to as a two-party message, in which one party is an inmate (who is either the sender or receiver) and one party is an outsider or visitor (who is either the sender or receiver). A two-party message may be sent or received by the inmate. In one embodiment of the invention, a message with multiple recipients may be referred to as a multi-party message, in which one or more parties are inmates and one or more parties are an outsider or visitor.

In one or more embodiments of the invention, media items within messages are obtained or created in a variety of ways. For example, media items may be text, audio, image, or video captured or composed on an inmate computing device, inmate kiosk, visitor kiosk, or outsider computing device. The media items may be imported from a third party provider, such as a photo hosting service or social network. The media items may be uploaded from a local data storage device, such as a flash drive, to an inmate computing device, inmate kiosk, visitor kiosk, or outsider computing device. In one embodiment of the invention, the inmate application, inmate kiosk, visitor kiosk, or outsider application includes software with functionality to generate a message using the provided media item and a target address.

In one or more embodiments of the invention, the identity data items (e.g., identity data item A (706A), identity data item N (706N)) are data structures with functionality to store information about users of the system (e.g., inmates, visitors, administrators, and outsiders). In one embodiment of the invention, each user (e.g., inmates, visitors, administrators, and outsiders) is associated with an identity data item (e.g., identity data item A (706A), identity data item N (706N)). In one embodiment of the invention, the identity data items (e.g., identity data item A (706A), identity data item N (706N)) include elements not shown in FIG. 7 (e.g., authentication data, unique identifiers, etc.).

In one or more embodiments of the invention, the restrictions (708) are digitally stored limitations applicable to the user (e.g., inmates, visitors, administrators, and outsiders) associated with the identity data item (identity data item A (706A), identity data item N (706N)). The restrictions (708) may include physical restrictions and/or communication restrictions as described above. Specifically, restrictions (708) may limitations based on, for example, the identity of the sender, the identity of the receiver, a crime the sender or receiver has been convicted or accused of, the controlled facility housing the inmate, the section of the controlled facility housing the inmate, the time of day, day of week, country or state in which the sender or receiver resides, the age of the sender or receiver, the gender of the sender or receiver, etc.

In one or more embodiments of the invention, the restrictions (708) include limitations in terms of attributes of media items that are to be rejected. Such attributes may be in terms of the content of the media item (e.g., a specific word that an inmate is not allowed to use in text messages, a person that the inmate is not allowed to have digital photos of, an activity that the inmate is not allowed to have digital photos of, etc.). Attributes may also be in terms of data about the media item (e.g., digital photos that exceed a certain size, audio files that are incompatible with the reviewer application, etc.). Attributes may also be in terms of the identity of the sender or recipient (e.g., a white list containing senders and recipients the inmate is allowed to communicate with, etc.). Attributes may be negative attributes (e.g., attributes that render a media item rejected) or positive attributes (e.g., attributes that a message or media item must include for that media item to be approved).

In one embodiment of the invention, the preliminary restrictions (714) are a subset of the restrictions (708)

applicable to unreviewed media items. Specifically, preliminary restrictions (714) may be used to determine whether an unreviewed media item is allowed to be viewed by the recipient (e.g., inmates, visitors, and outsiders) prior to the media item being reviewed. For example, a preliminary restriction (714) may instruct the message server (732) that all digital photos should be placed in the conditionally held repository (718) and all digital text (e.g., text-only emails) should be placed in the conditionally viewable repository (716). The preliminary restrictions (714) may be imposed by the same entities that impose other restrictions as described above.

In one embodiment of the invention, the preliminary restrictions (714) are dependent on the content or attributes of the media item. Further, the preliminary restrictions (714) may indicate that a media item should not be viewable by the intended recipient prior to review unless the media item has investigative significance. For example, a media item that is an email that includes the word "evidence" may be allowed to be viewed in order to obtain additional knowledge or an indication of complicity in a crime from the recipient.

In one or more embodiments of the invention, each repository (e.g., conditionally viewable repository (716), conditionally held repository (718), approved repository (720), rejected repository (722)) is a data structure with functionality to store media items (e.g., digital photo files, digital video files, digital text files). The repositories (e.g., conditionally viewable repository (716), conditionally held repository (718), approved repository (720), rejected repository (722)) may be implemented as separate data structures, as shown in FIG. 7. Alternatively, the repositories (e.g., conditionally viewable repository (716), conditionally held repository (718), approved repository (720), rejected repository (722)) may be implemented as a single data structure that distinguishes the status of media items (e.g., using tags, metadata, etc.).

In one or more embodiments of the invention, unreviewed media items received from an inmate, outsider, or visitor are first evaluated according to the preliminary restrictions (714) and placed (i.e., digitally stored in, copied to, etc.) in either the conditionally viewable repository (716) or a conditionally held repository (718). Specifically, media items that may be viewed by the recipient (e.g., an inmate, an outsider, a visitor) according to the preliminary restrictions (714) are placed in the conditionally viewable repository (716). Media items that may not be viewed by the recipient (e.g., an inmate, an outsider, a visitor) according to the preliminary restrictions (714) are placed in the conditionally held repository (716).

In one or more embodiments of the invention, unreviewed media items are subjected to a review process by the reviewer application (724). Specifically, the reviewer application (724) obtains an unreviewed media item from the unreviewed media items (710) and makes a determination regarding whether the media item should be approved or rejected based on one or more restrictions (708). Although the reviewer application (724) is shown in FIG. 7 as executing within a reviewer computing device (702), in one or more embodiments of the invention, the reviewer application (724) executes within another local or remote system.

In one or more embodiments of the invention, the reviewer application is operated by a human reviewer. Specifically, a human reviewer operating the reviewer application (724) views or listens to the media item and compares the attributes of the media item to the restrictions (708). The human reviewer may then mark the media item for placement in the appropriate reviewed media item (712) repository (e.g., the approved repository (720), the rejected repository (722)).

In one or more embodiments of the invention, the reviewer application is operated by a software reviewer. Specifically, a software reviewer (not shown) within the reviewer application (724) processes the media item to obtain attributes and compares the attributes of the media item to the restrictions (708). In one embodiment of the invention, the software reviewer processes the media item to identify attributes of the media item including recognized individuals, nudity, background scenery, objects, metadata (e.g., time the media item was created or modified, location information about the media item, etc.). Based on the obtained attributes, the software reviewer may then mark the media item for placement in the appropriate reviewed media item (712) repository (e.g., the approved repository (720), the rejected repository (722)).

In one or more embodiments of the invention, the review process uses a combination of software reviewer and human reviewer. Specifically, a media item may first be processed by a software reviewer and then sent to the human reviewer based on the obtained attributes. For example, a software reviewer may have a 45% false positive rate when detecting nudity and therefore any media item that a software reviewer detects as including nudity attributes may be sent to a human reviewer for a second review. In one embodiment of the invention, determining the attributes of a media item may be divided between the software reviewer and the human reviewer. For example, a software reviewer may process a media item using facial recognition software in order to determine whether the presence of anyone in the media item is adverse to the restrictions associated with the inmate (a task that may be difficult or nearly impossible for a human reviewer), and a human reviewer may be charged with determining whether a media item includes any gang references (a task that may be difficult or nearly impossible for a software reviewer). Further detail regarding the reviewing process is described in FIG. 8.

In one or more embodiments of the invention, the auditor computing device (704) is a computer system or group of computer systems with functionality to execute the auditor application (726). In one embodiment of the invention, the auditor application (726) evaluates the results of the review process performed by the human and/or software reviewer and determines a rate of error for the reviewer. Further detail regarding the auditor application (726) is described in FIG. 9.

In one or more embodiments of the invention, media items sent from an inmate and placed in the inmate's approved repository (720) are viewable by the recipient outsider or visitor. In one embodiment of the invention, a reference to the media item is sent to the recipient outsider or visitor, as opposed to a copy of the media item itself. In the event that the media item is determined (e.g., by an auditor application (726)) to be improperly placed in the approved repository (720), the media item is transferred to the media item to the rejected repository (722) and the outsider or visitor recipient will no longer have the ability to view the media item. In one embodiment of the invention, the recipient of a message that contains a rejected media item may receive an indication that the sender attempted to send a message, but the message contents (i.e., the media item) was rejected.

Figure 8:
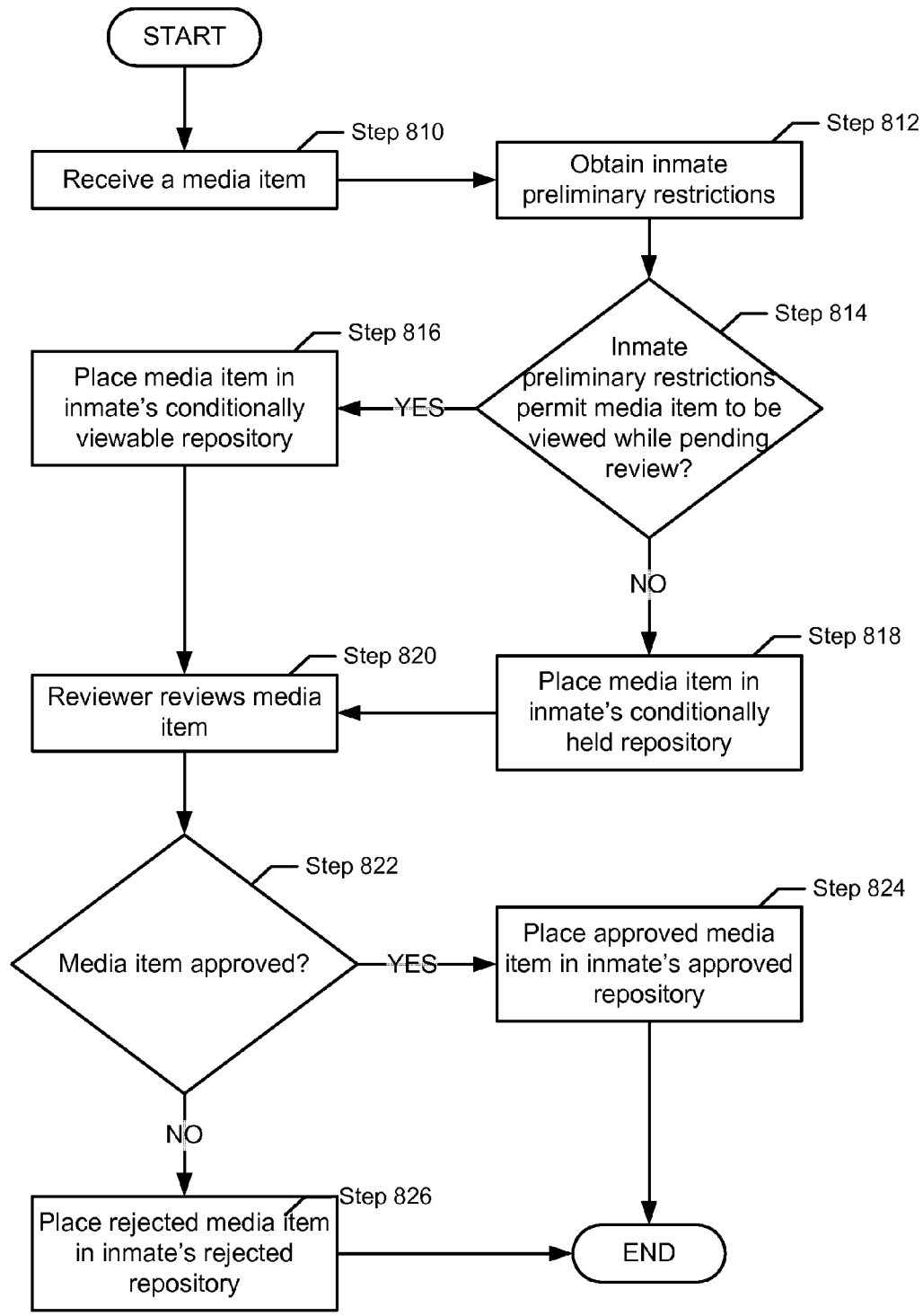
FIG. 8 shows a flow diagram in accordance with one or more embodiments of the invention.

FIG. 8 shows a flowchart for reviewing a media item in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 810, the message server receives a media item. In one embodiment of the invention, the media item is extracted from a message sent to/from an inmate. In Step 812, preliminary restrictions associated with the inmate are obtained. In one embodiment of the invention, the preliminary restrictions are obtained from an identity data item associated with the inmate. In Step 814, the preliminary restrictions are used to determine whether the media item may be viewed all pending review. In one embodiment of the invention, determining whether the preliminary restrictions allow the media item to be viewed while pending review requires that the message server perform some preliminary processing on the media item. Such preliminary processing may include, for example, determining the type of media item (e.g., a digital photograph, a digital video, etc.) and/or the content of the media item (e.g., a text message including swearwords, etc.).

If in Step 814 the message server determines that the preliminary restrictions permit the media item to be viewed while pending review, then in Step 816, the media item is placed in the inmate's conditionally viewable repository. If in Step 814 the message server determines that the preliminary restrictions do not permit the media item to be viewed while pending review, then in Step 818, the message server places the media item in the inmates conditionally held repository.

In Step 820, the reviewer reviews the media item. In one embodiment of the invention, Step 820 involves both a human reviewer and a software reviewer. In Step 822, the message server determines whether the media item has been approved by the reviewer. If in Step 822 the media item is approved by the reviewer, then in Step 824, the media item is placed in the inmates approved repository. If in Step 822 the media item is not approved by the reviewer, then in Step 826, the media item is placed in the inmates rejected repository. In one embodiment of the invention, rejected media items are saved in the rejected repository for evaluation by administrators or investigators.

Figure 9:
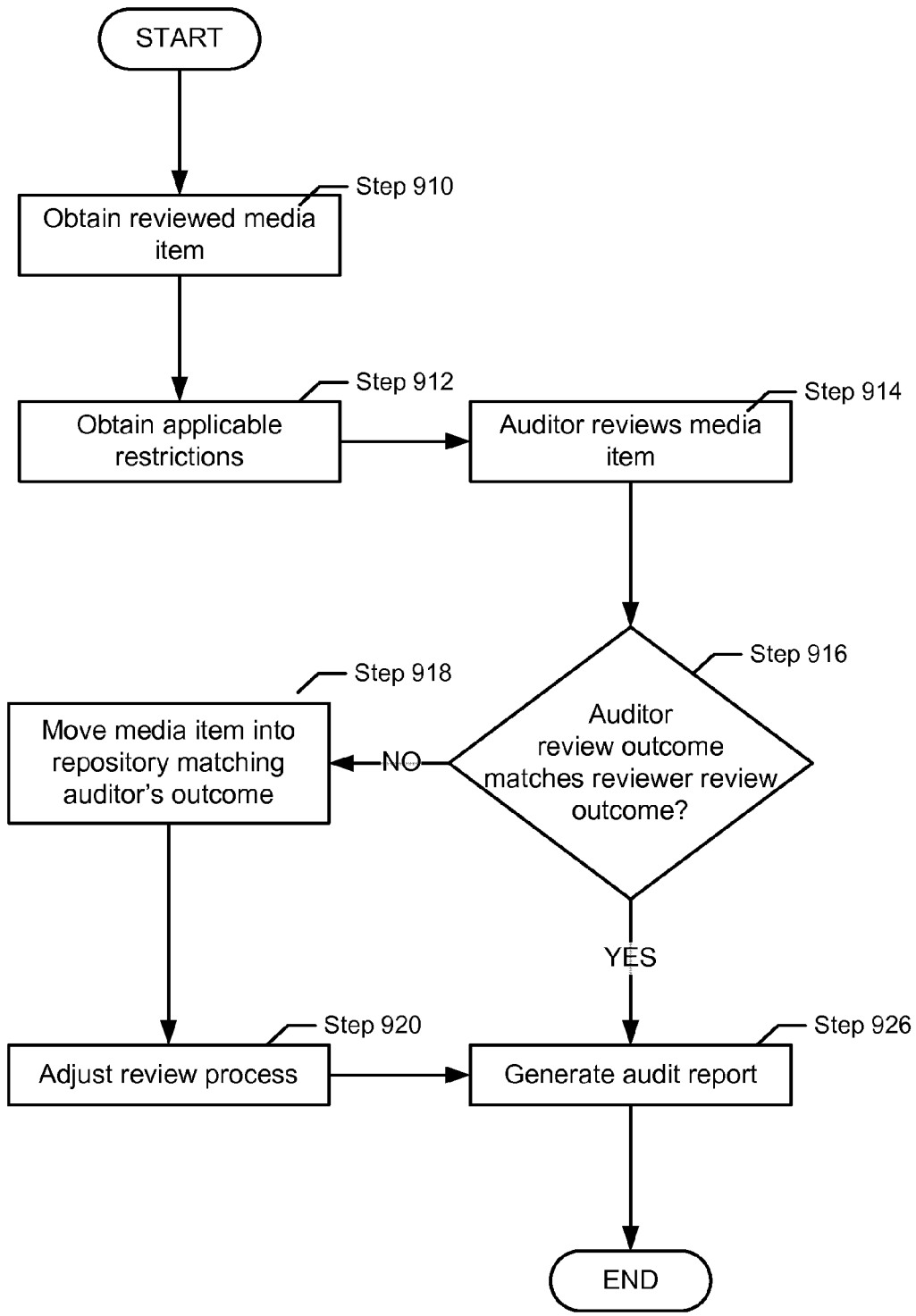
FIG. 9 shows a flow diagram in accordance with one or more embodiments of the invention.

FIG. 9 shows a flowchart for auditing a reviewer in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 910, the auditor application obtains a reviewed media item. The auditor application may obtain a reviewed media item from an approved repository or a rejected repository. In Step 912, the auditor application obtains the restrictions applicable to the media item. The applicable restrictions may be associated with the recipient or the sender. In Step 914, the auditor reviews the media item. In one embodiment of the invention, the auditor is a human auditor operating the auditor application. In one embodiment of the invention, the auditor is a software auditor within the auditor application. In one embodiment of the invention, a software auditor may be used that is more expensive in terms of time or resources than the software reviewer. The software auditor may be used sparingly to determine the accuracy of a software reviewer or human reviewer.

In Step 916, the auditor application determines whether the auditor review outcome matches the reviewer of review outcome. If in Step 916 the auditor review outcome does not match the reviewer review outcome, then in Step 918, the media item is moved into the repository matching the auditor's outcome. For example, in the event that the auditors review outcome rejects the media item and the reviewers review outcome approves the media item than the media item is placed in the rejected repository. In Step 920, the review process is adjusted.

In one or more embodiments of the invention, adjusting the review process takes place after a statistically significant sample has been evaluated. Specifically, a threshold number of media items may be evaluated and a percentage score may be obtained describing the overall accuracy of the reviewer based on the rate at which the reviewer outcome matches the auditor outcome. That percentage score may then be compared to a threshold score indicating the minimum expected accuracy. If the percentage score does not exceed the threshold, then the reviewer may be adjusted (for a software reviewer) or retrained (for a human reviewer). If in Step 916 the auditor review outcome matches the reviewer review outcome, then in Step 926, an audit report is generated. In one embodiment of the invention, the audit report may be used by administrators of the controlled facility to determine the efficacy of a reviewer or a review process.

Figure 10A:
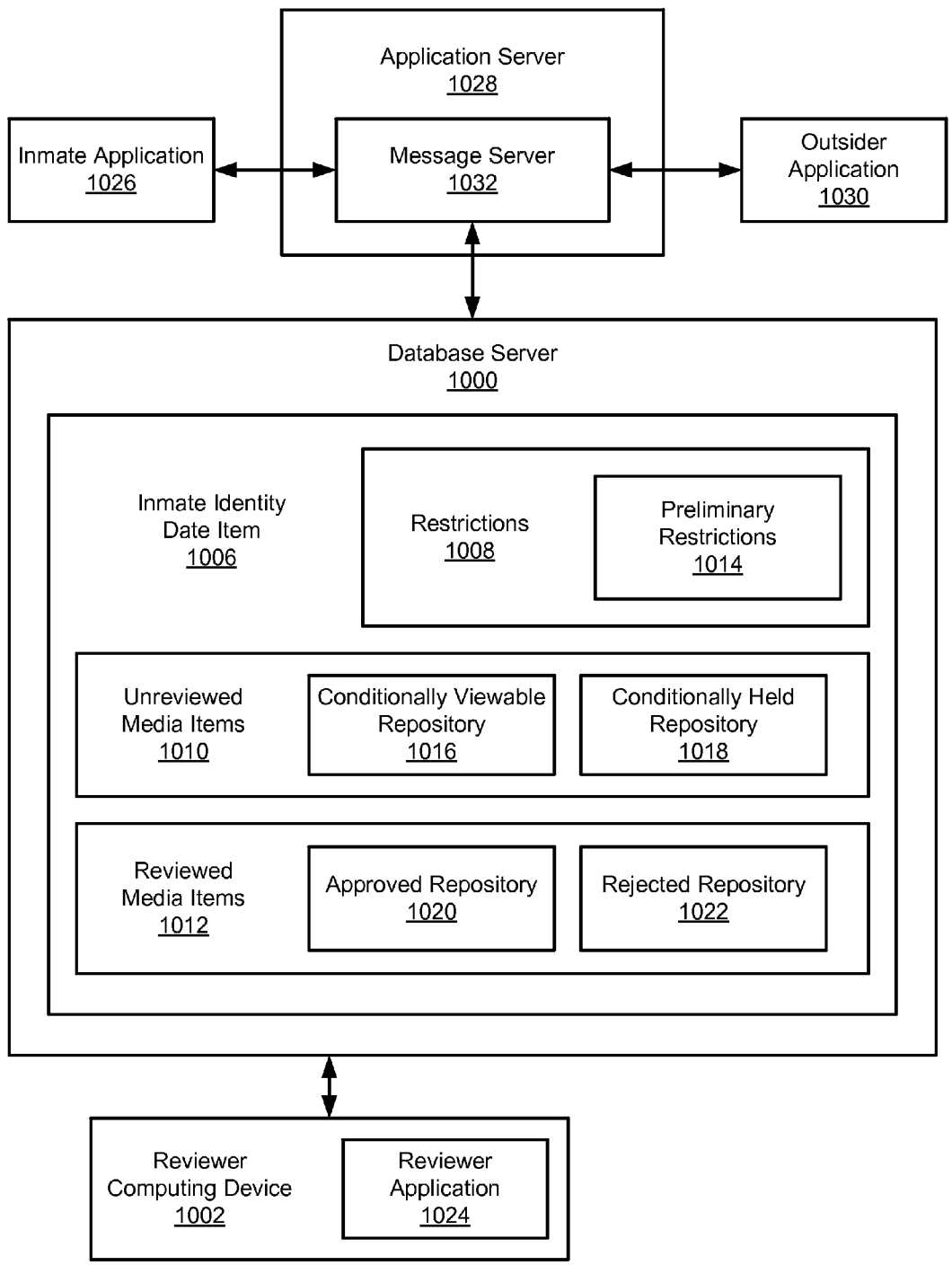
FIGS. 10A-10B show an example in accordance with one or more embodiments of the invention.
Figure 10B:
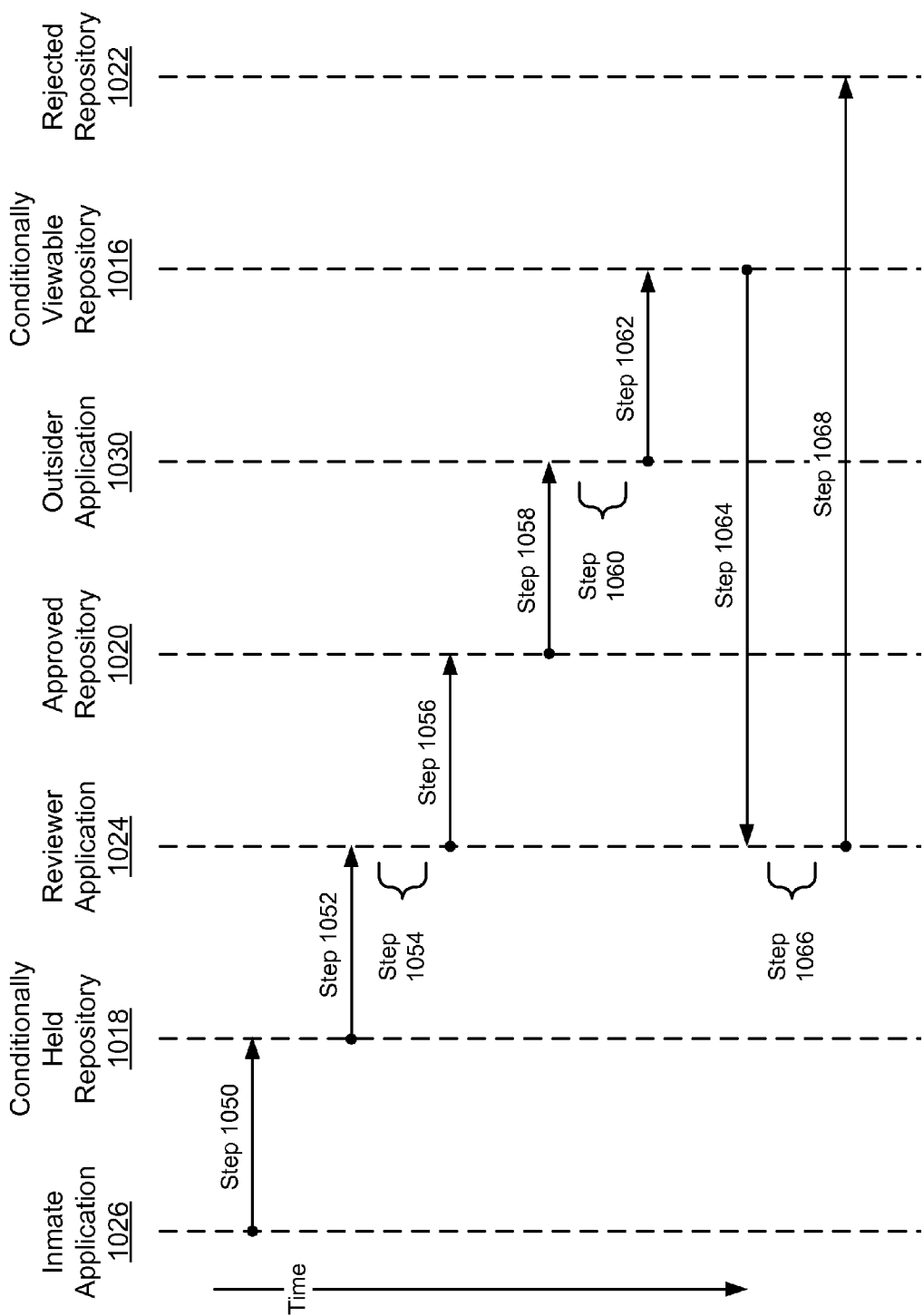

FIGS. 10A and 10B show an example in accordance with one or more embodiments of the invention. Specifically, FIG. 10A shows an example system in accordance with one or more embodiments of the invention. As shown in FIG. 10A, the example system includes a database server (1000) communicatively coupled to an application server (1028), and a reviewer computing device (1002). The database server (1000) includes an inmate identity data item (1006). The inmate identity data item (1006) includes restrictions (1008), unreviewed media items (1010), and reviewed media items (1012). The restrictions (1008) include preliminary restrictions (1014). The unreviewed media items (1010) include a conditionally viewable repository (1016) and a conditionally held repository (1018). The reviewed media items (1012) include an approved repository (1020) and a rejected repository (1022). The reviewer computing device (1002) includes a reviewer application (1024). The application server (1028) is communicatively coupled to an inmate application (1026) and an outsider application (1030). The application server (1002) includes a message server (1032).

For the purposes of the example, assume that the inmate data item (1006) is associated with an inmate named "John Smith" with the unique identifier "j_smith00". Also assume that the preliminary restrictions (1014) indicate that all digital photos are placed in the conditionally viewable repository (1016). Assume further that the preliminary restrictions (1014) indicate that text messages that include the term "gang" are placed in the conditionally held repository (1018). Further, for the purposes of the example, assume that the restrictions (1008) indicate that no media items containing gang signs are allowed to be sent or received by j_smith00. Finally, assume that the restrictions (1008) indicate that "m_smith00" (the unique identifier for a person named "Mary Smith") is on JS2013's white list (i.e., is approved for message exchange).

FIG. 10B shows an example timeline in accordance with one or more embodiments of the invention. As shown in FIG. 10B, the message server receives, from inmate application (1026), a two-party message from j_smith00 targeting m_smith00 containing a first media item (Step 1050). Assume that the first media item is a text message that reads "Send me that photo of you and me at the family reunion.

The one with mom and dad and the whole gang." Continuing with Step 1050, the message server obtains the preliminary restrictions and determines that the message should be placed in the conditionally held repository (1018) because the media item contains the term "gang". At this point, Mary Smith may log on to the outsider application, but will be unable to view the text of the message. However, she may receive an indication that a message has been sent, but is pending review. In Step 1052, the reviewer application (1024) obtains the media item from the conditionally held repository (1018) for review.

In Step 1054, a human reviewer reviews the text message and determines that the context of the term "gang" is not inappropriate and that the media item as a whole should be approved. In Step 1056, the media item is placed in j_smith00's approved repository (1020). In Step 1058, Mary Smith logs on to the outsider application (1030) and is able to view the message.

In Step 1060, Mary Smith creates a new two-party message targeting j_smith00 using the outsider application (1030) and attaches a digital photo. The digital photo shows John Smith, Mary Smith, and three other individuals. In the digital photo, John Smith has formed the fingers on his left hand in the shape of a known gang sign.

In Step 1062, the message server (1032) receives the message from m_smith00 targeting j_smith00 containing a second media item (i.e., the digital photo). The message server obtains the preliminary restrictions and determines that the message should be placed in the conditionally viewable repository (1016) because the media item is a digital photo. At this point, John Smith may log on to the inmate application and view the digital photo.

In Step 1064, the reviewer application (1024) obtains the media item from the conditionally viewable repository (1016) for review. In Step 1066, the media item is reviewed. Assume that the review process in Step 1066 includes a two-step review in situations where a digital photo contains potential gang signs. First, a software reviewer processes the digital photo and determines whether it contains attributes of an individual forming their fingers in an unusual manner (but is unable to determine with reliable accuracy that the formation is a gang sign). Based on this determination, the software reviewer sends the media item to a human reviewer for further evaluation. The human reviewer views the media item and determines that the individual in the digital photo is displaying a known gang sign. In Step 1068, the human reviewer places the media item in j_smith00's rejected repository (1022).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reviewing communications of an inmate comprising:
    receiving a two-party message comprising a media item, wherein a first party of the two-party message is the inmate, and wherein the two-party message targets a recipient;
    determining that a first portion of the media item is viewable prior to completion of a pending review of the media item;
    placing the first portion of the media item in a conditionally viewable repository for the inmate;
    making the first portion of the media item accessible to the recipient based on the first portion being placed in the conditionally viewable repository for the inmate;
    determining that a second portion of the media item is not viewable pending review;
    placing the second portion of the media item in a conditionally held repository for the inmate;
    making the second portion of the media item inaccessible to the recipient based on the second portion being placed in the conditionally held repository for the inmate;
    receiving review results of a review process performed on the media item, wherein the review results indicate that the media item is rejected;
    moving the media item to a rejected repository based on the review results; and
    making the two-party message inaccessible to the recipient based on the media item being placed in the rejected repository for the inmate,
    wherein the first portion of the media item is accessible to the recipient prior to receiving the review results and inaccessible to the recipient subsequent to receiving the review results.

2. The method of claim 1, wherein placing the first portion of the media item in the conditionally viewable repository for the inmate comprises:
    obtaining preliminary restrictions for the inmate, and
    placing the first portion of the media item in the conditionally viewable repository based on the preliminary restrictions.

3. The method of claim 1, wherein the review process performed on the media item comprises:
    obtaining restrictions for the inmate,
    determining an attribute of the media item, and
    generating the review results based on a comparison of the restrictions and the attribute.

4. The method of claim 3, wherein the review process is performed by a software reviewer.

5. The method of claim 1, wherein a second party of the two-party message is external to a controlled facility housing the inmate.

6. The method of claim 1, wherein the recipient is the inmate.

7. A non-transitory computer readable medium comprising instructions that, when executed by a processor, perform a method for reviewing communications of an inmate, the method comprising:
    receiving a two-party message comprising a media item, wherein a first party of the two-party message is the inmate, and wherein the two-party message targets a recipient;
    determining that a first portion of the media item is viewable prior to completion of a pending review of the media item;
    placing the first portion of the media item in a conditionally viewable repository for the inmate;
    making the first portion of the media item accessible to the recipient based on the first portion being placed in the conditionally viewable repository for the inmate;
    determining that a second portion of the media item is not viewable pending review;
    placing the second portion of the media item in a conditionally held repository for the inmate;
    making the second portion of the media item inaccessible to the recipient based on the second portion being placed in the conditionally held repository for the inmate;

receiving review results of a review process performed on the media item, wherein the review results indicate that the media item is rejected;

moving the media item to a rejected repository based on the review results; and making the two-party message inaccessible to the recipient based on the media item being placed in the rejected repository for the inmate, wherein the first portion of the media item is accessible to the recipient prior to receiving the review results and inaccessible to the recipient subsequent to receiving the review results.

8. The non-transitory computer readable medium of claim 7, wherein placing the first portion of the media item in the conditionally viewable repository for the inmate comprises:

obtaining preliminary restrictions for the inmate, and placing the first portion of the media item in the conditionally viewable repository based on the preliminary restrictions.

9. The non-transitory computer readable medium of claim 7, wherein the review process performed on the media item comprises:

obtaining restrictions for the inmate, determining an attribute of the media item, and generating the review results based on a comparison of the restrictions and the attribute.

10. The non-transitory computer readable medium of claim 9, wherein the review process is performed by a software reviewer.

11. The non-transitory computer readable medium of claim 7, wherein a second party of the two-party message is external to a controlled facility housing the inmate.

12. The non-transitory computer readable medium of claim 7, wherein the recipient is the inmate.

13. A system for reviewing communications of an inmate, comprising:

a computer processor;

a message server executing on the computer processor, and configured to:

receive a two-party message comprising a media item, wherein a first party of the two-party message is the inmate, and wherein the two-party message targets a recipient;

determine that a first portion of the media item is viewable prior to completion of a pending review of the media item;

place the first portion of the media item in a conditionally viewable repository for the inmate;

make the first portion of the media item accessible to the recipient based on the first portion being placed in the conditionally viewable repository for the inmate;

determine that a second portion of the media item is not viewable pending review;

place the second portion of the media item in a conditionally held repository for the inmate;

make the second portion of the media item inaccessible to the recipient based on the second portion being placed in the conditionally held repository for the inmate;

receive review results of a review process performed on the media item, wherein the review results indicate that the media item is rejected;

move the media item to a rejected repository based on the review results; and make the two-party message inaccessible to the recipient based on the media item being placed in the rejected repository for the inmate, wherein the first portion of the media item is accessible to the recipient prior to receiving the review results and inaccessible to the recipient subsequent to receiving the review results; and a database server comprising:

the conditionally viewable repository, the conditionally held repository, and the rejected repository.

14. The system of claim 13, wherein the database server further comprises:

preliminary restrictions for the inmate, and wherein the message server is further configured to:

obtain preliminary restrictions for the inmate, and place the first portion of the media item in the conditionally viewable repository based on the preliminary restrictions.

15. The system of claim 13, wherein the database server further comprises:

restrictions for the inmate, and a reviewer application configured to:

obtain the restrictions for the inmate, determine an attribute of the media item, and generate the review results based on a comparison of the restrictions and the attribute.

16. The system of claim 13, further comprising:

an inmate application, and an outsider application, wherein the message is generated by one selected from a group consisting of the inmate application and the outsider application.

17. The system of claim 16, wherein the inmate application is executing on a computing system located within a controlled facility.

* * * * *